United States Patent [19]

Tompkins

[11] Patent Number: 4,614,123
[45] Date of Patent: Sep. 30, 1986

[54] VERTICAL VIBRATOR

[75] Inventor: L. Kirk Tompkins, Little Rock, Ark.

[73] Assignee: Global Manufacturing Co, Inc., Little Rock, Ark.

[21] Appl. No.: 690,729

[22] Filed: Jan. 11, 1985

[51] Int. Cl.[4] .......................... F01M 9/00; F16H 57/04
[52] U.S. Cl. .......................................... 74/87; 74/467; 184/6.18
[58] Field of Search ................... 74/87, 467; 184/6.12, 184/6.18

[56] References Cited

U.S. PATENT DOCUMENTS

| 2,085,814 | 7/1937 | Matthews et al. | 184/6.12 |
| 2,125,917 | 8/1938 | Hanna | 184/6.18 |
| 2,334,775 | 11/1943 | Karp | 184/6.12 |
| 2,719,667 | 10/1955 | Kaczor | 184/6.18 |
| 3,277,732 | 10/1966 | Wahl | 74/87 |
| 3,522,740 | 8/1970 | Hynes et al. | 74/87 |
| 3,848,702 | 11/1974 | Bergman | 184/6.18 |

FOREIGN PATENT DOCUMENTS

| 1158473 | 6/1958 | France | 184/6.18 |
| 338209 | 6/1959 | Switzerland | 184/6.18 |
| 952414 | 3/1964 | United Kingdom | 74/467 |
| 222075 | 10/1968 | U.S.S.R. | 184/6.18 |
| 691633 | 10/1979 | U.S.S.R. | 74/467 |

Primary Examiner—Lawrence Staab
Attorney, Agent, or Firm—Stephen D. Carver

[57] ABSTRACT

A self lubricating industrial vibrator for applications requiring vertical installation. The vibrator comprises a rigid generally cylindrical housing in which an elongated, rotatable shaft is vertically, coaxially received for rotatable displacement by an external conventional motor. Eccentrics secured on opposite ends of the shaft provide vibration, and the shaft is operationally secured for rotation within suitable bearing structure. An oil passageway is thus defined interiorly of the bearing casing, at opposite ends of the internal shaft between upper and lower annular bearing caps. A first lubricating oil reservoir is disposed within the bearing housing in fluid flow communication with a portion of the lower shaft, and the shaft includes an internal, coaxially defined elongated bore which has been internally, spirally grooved. This "rifled" shaft bore or interior draws lubricating oil up and through the shaft and distributes it through the bearings through suitable oiling pathways for continual and reliable self lubrication. Additionally, a rotatable, shaft-driven impeller disposed within a second oil reservoir outside of the bearing housing forces oil upwardly through the shaft bore in cooperation with the rifling, whereby to effectuate oil flow communication between the first and second oil reservoirs.

1 Claim, 13 Drawing Figures

VERTICAL VIBRATOR

BACKGROUND OF THE INVENTION

The present invention relates generally to industrial vibrators. More particularly, the present invention is directed to a self oiling industrial vibrator which is ideally adapted to be mounted and employed in a vertical orientation.

In the prior art industrial vibrators are well known. As will be appreciated by those skilled in the art, conventional industrial vibrators may include a rigid, generally cylindrical housing in which a suitable shaft is rotatably disposed. A variety of different but conventional bearings may be employed to operationally secure the shaft, and one or more eccentrics are mechanically secured to the shaft to generate the vibration which is transmitted to the intended application. While various systems for internally lubricating vibrator bearings are known, all prior art vibrators known to me suffer from rapid internal wear when they are disposed in a vertical orientation rather than a horizontal orientation. Resultant premature bearing failure, for example, has hitherto been a virtually inevitable but deleterious side effect intimately associated with vertical vibrator mounting.

Notwithstanding the foregoing, many industrial applications requiring vibrator installation are most efficient when the vibrator is mounted. Vertical mounting often insures that the hopper, storage bin, or other application upon which the vibrator is mounted will be dependably, forcibly agitated. Premature bearing failure along with attendant premature wear of internal seals and the shaft has hitherto been experienced as a direct result of non-uniform oiling or lubrication where "horizontal" vibrators are employed in "vertical" applications.

The most pertinent prior art known to me comprises U.S. Pat. No. 3,922,043 issued Nov. 25, 1975 and U.S. Pat. No. 4,270,396 issued June 2, 1981. Both of the latter references are owned by the same assignee as in this case. Other pertinent prior art believed possibly relevant to this invention is shown in the following U.S. Pat. Nos.: 3,386,296; 3,036,658; 2,930,244; 3,792,617; 2,972,688 and, 3,446,084.

Because of the aforedescribed problems experienced in conjunction with the vertical mounting and operation of conventional vibrators, and since vertical mounting is nevertheless an industrial necessity, the present internal self oiling system to be hereinafter described has been designed.

SUMMARY OF THE INVENTION

The present invention comprises a self lubricating industrial vibrator adapted to be vertically installed for agitating a storage bin, hopper or other industrial application.

Preferably the vibrator includes a generally cylindrical housing including a hollow interior, which housing is adapted to be mechanically secured upon (or in mechanical, vibratory contact with) its intended application via an associated conventional flange-like base, a remote mounting bracket or the like. An elongated, rotatable shaft is substantially coaxially disposed for rotation within the housing, and it is rotatably secured by suitable bearing structure. Suitable internal eccentrics are secured to the shaft at its opposite ends, whereby rotation of the shaft by an external hydraulic or pneumatic motor (not forming part of the present invention) insures rapid and dependable vibration of the entire assembly.

Importantly, the vibrator shaft includes a central, internal tubular bore provided with an elongated, spiralled groove. In other words the interior of the shaft is appropriately "rifled", and in response to rapid vibration of the shaft lubricating oil is drawn upwards through the shaft and distributed for oiling of the bearings and associated structure. The bearing structure is suitably secured between a pair of annular end caps. Suitable oil receptive areas are defined between the bearings and these annular caps. Preferably an oil passageway defined transversely through the bottom end of the shaft communicates with the lower oil reservoir such that rotation of the shaft will "suck" oil upwardly through the internal periphery of the shaft, and it will be centrifugally forced outwardly of the shaft top through suitable ports. The oiling pathway adequately insures that lubricating oil is continually forced upon the top of the shaft bearings. Oil droppings downwardly through the bearing housing is returned to the aforementioned reservoir, which is disposed in fluid flow communication with the inlet ports of the rifled shaft bore. Recycling of oil in this fashion can continue, and the latter pathway comprises a first recirculation path to be hereinafter described in detail.

In the best mode a second oil reservoir is disposed within a suitable chamber formed in the casing at the bottom of the apparatus, and an oil-forcing impeller is disposed within this second reservoir. A lowermost portion of the rotatable vibrator shaft is mated to the impeller by a suitable nipple assembly, and the interior of the shaft is thus disposed in fluid flow communication with the second reservoir via the appropriately-ported impeller. Oil dropping through the interior confines of the housing reaching this latter region is similarly drawn upwardly for recycling through the rotating shaft.

Preferably a one way check valve is disposed within the bottom of the bore of the shaft to prevent draining of the shaft interior when the vibrator is deactivated. In this manner initial start-up of the vibrator will not score the bearings, since forced oiling will immediately result.

Thus an important object of the present invention is to provide an industrial vibrator for vertical mounting and orientation.

Similarly, it is an important object of the present invention to provide a "vertical vibrator" which insures continuous and dependable forced lubrication.

Yet another object of the present invention is to provide a shaft driven system for oiling internal parts.

Another important object is to provide a vibrator with a system for insuring bearing lubrication, even after long period of non-use.

These and other objects and advantages of the present invention, along with features of novelty appurtenant thereto, will appear or become apparent in the course of the following descriptive sections.

BRIEF DESCRIPTION OF THE DRAWINGS

In the folowing drawings, which form a part of the specification and which are to be construed in conjunction therewith, and in which like reference numerals have been employed throughout wherever possible to indicate like parts in the various views.

DETAILED DESCRIPTION OF THE DRAWINGS

Figure 1:
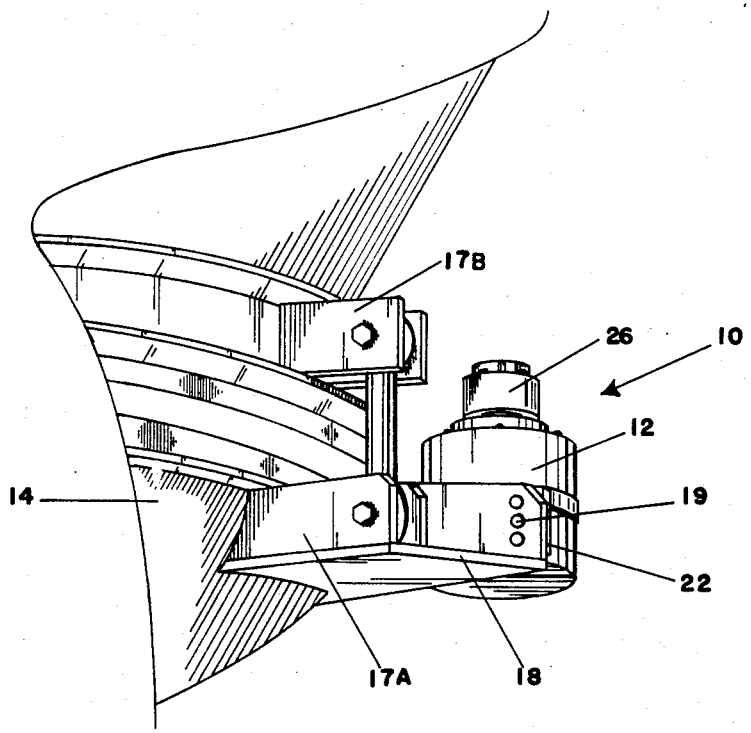
FIG. 1 is a fragmentary pictorial view illustrating a vibrator constructed in accordance with the teachings of the present invention suitably vertically mounted in conjunction with a typical industrial application (i.e. a storage bin.

With initial reference now directed to FIG. 1 of the drawings, an industrial vibrator constructed in accordance with the best mode of the present invention has been generally designated by the reference numeral 10. Vibrator 10 preferably includes a substantially cylindrical, rigid mechanical casing, generally designated by the reference numeral 12, which is adapted to be mounted vertically. Illustrated generally by the reference numeral 14 is a portion of a generally conical bin of conventional construction. Vibrator 10 may be secured to its intended application through a variety of conventional mounting techniques, but illustrated is a suitable mounting plate 18 fastened through a plurality of bolts 19 to base 22 of the casing 12. Plate 18 is further operationally secured by conventional steel hangers 17A, 17B. While a conventinal hydraulic motor 26 is illustrated for actuating vibrator 10, it should be understood that motor 26 may comprise a suitable conventional electric motor, pneumatic motor, belt driven pulley or the like.

Figure 2:
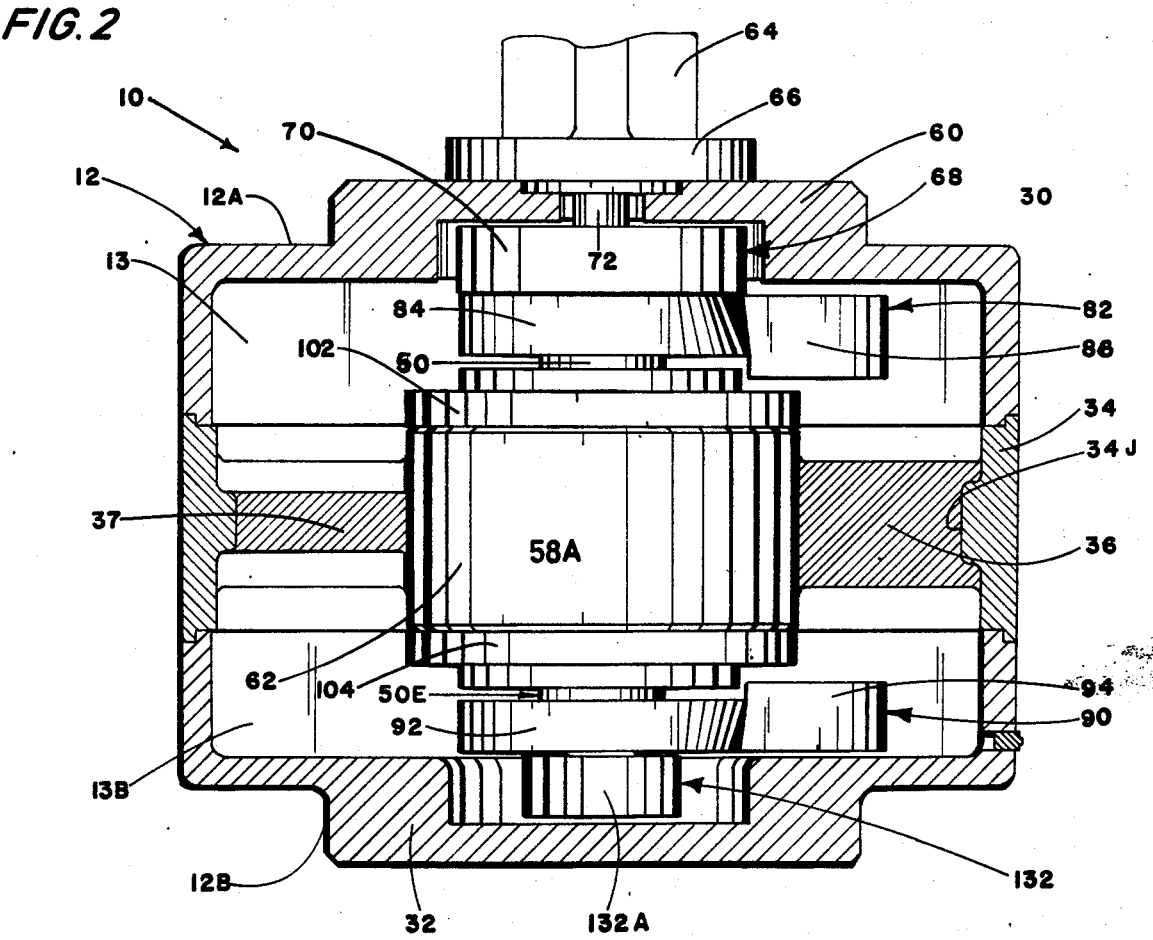
FIG. 2 is an enlarged, fragmentary, isometric view of the interior of the vibrator with the casing portion thereof omitted for clarity.

With additional reference now to FIGS. 2-13, the vibrator casing 12 is preferably cylindrical. In the best mode known to me the casing 12 includes an upper casing portion 30 mated to a lower casing portion 32 by an intermediate, annular ring-like section 34 from which inwardly projecting web mountings 36, 37 emanate. The web construction may be similar to that previously disclosed in in my prior U.S. Pat. No. 3,922,043, but the preferred web construction will hereinafter be described in detail. The top of the casing 12 has been generally designated by the reference numeral 12A and the bottom thereof has been generally designated by the reference numeral 12B (FIG. 2). The substantially hollow interior of the casing has been generally designated by the reference numeral 13, and it will be understood that the operative moving portions of the vibrator to be hereinafter described are generally housed coaxially centrally within casing 12. The vertically disposed longitudinal axis of the casing 12 (and thus of the vibrator 10) has been generally identified by the reference numeral 17C, and in a "vertical" vibrator, as the term is used herein, it should be understood that the operating rotatable shaft is disposed either parallel to the aforementioned axis, or preferably coaxially with respect thereto.

Figure 3:
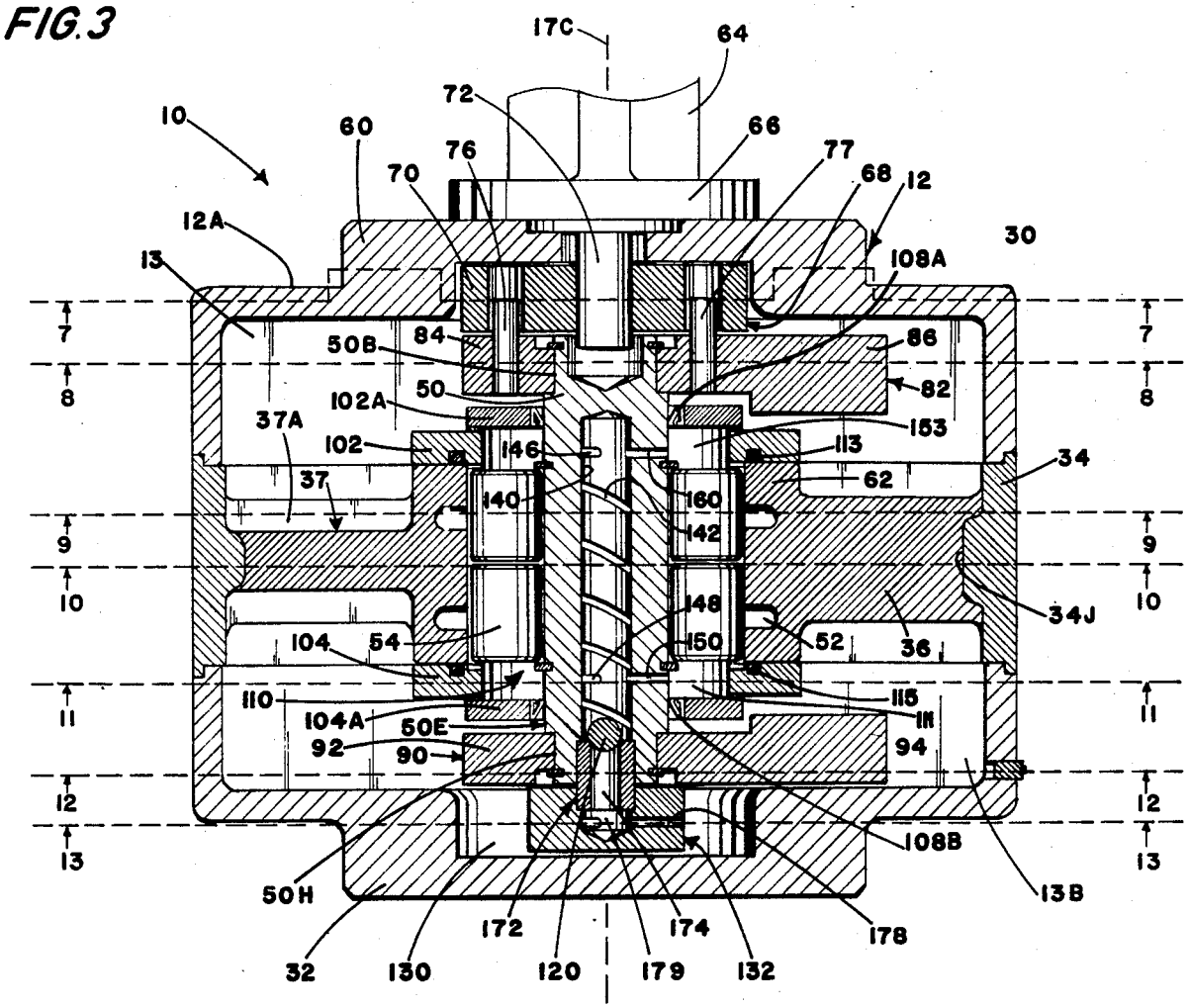
FIG. 3 is a vertical longitudinal sectional view of the invention.
Figure 7:
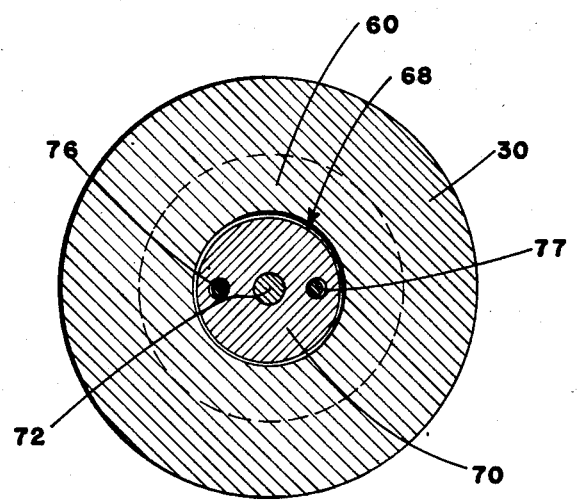
FIG. 7 is a reduced scale fragmentary sectional view taken generally along line 7—7 of FIG. 3.
Figures 4, 5, 6:
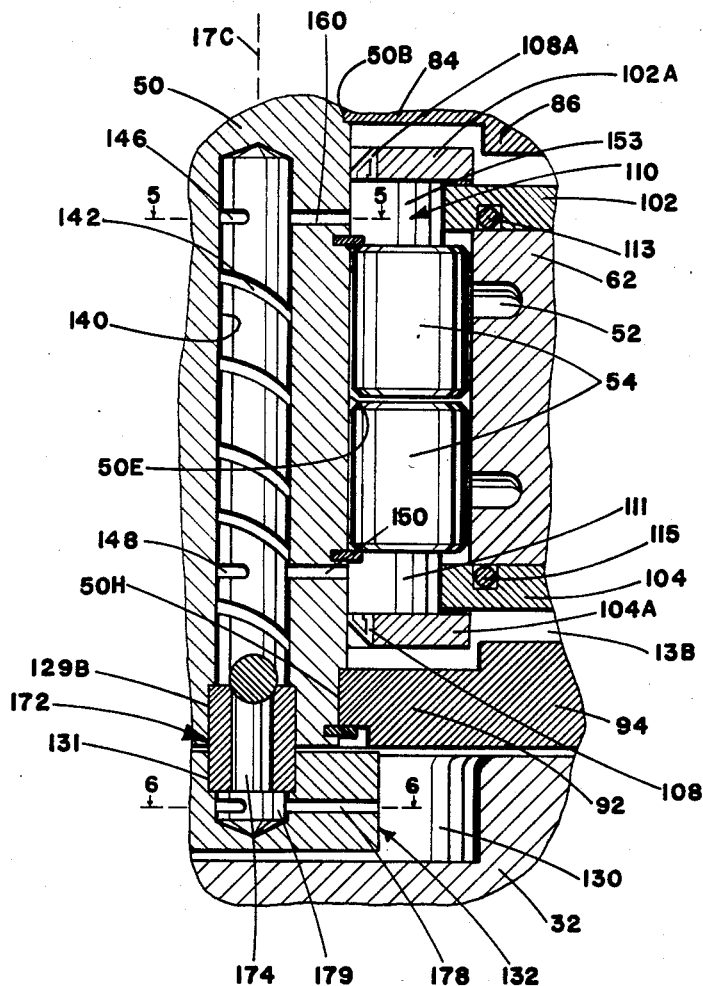
FIG. 4 is an enlarged, fragmentary sectional view illustrating the oiling passageways.
FIG. 5 is an enlarged, fragmentary sectional view taken generally along line 5—5 of FIG. 4 in the direction of the arrows.
FIG. 6 is an enlarged, fragmentary sectional view taken generally along line 6—6 of FIG. 4 in the direction of the arrows.
Figure 8:
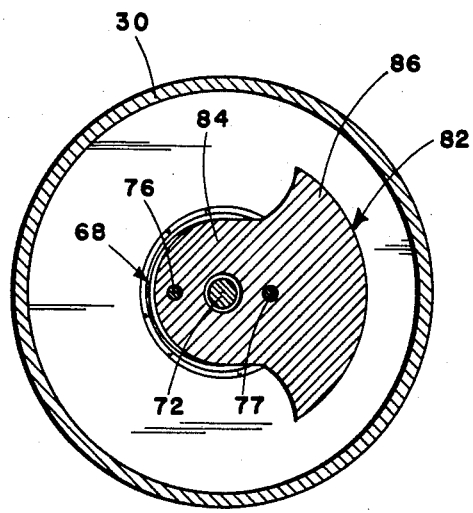
FIG. 8 is a reduced scale sectional view taken generally along line 8—8 of FIG. 3.
Figure 9:
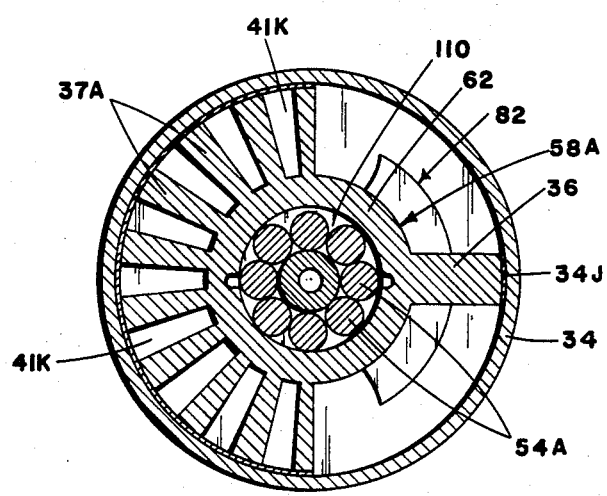
FIG. 9 is a reduced scale sectional view taken generally along line 9—9 of FIG. 3.
Figure 10:
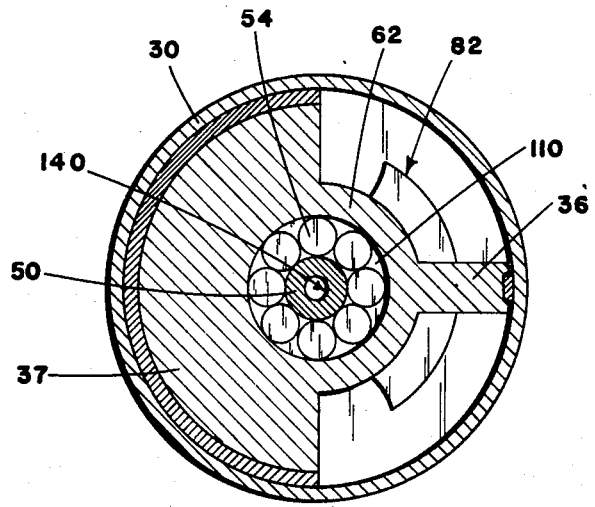
FIG. 10 is a reduced scale sectional view taken generally along line 7—7 of FIG. 3.
Figure 11:
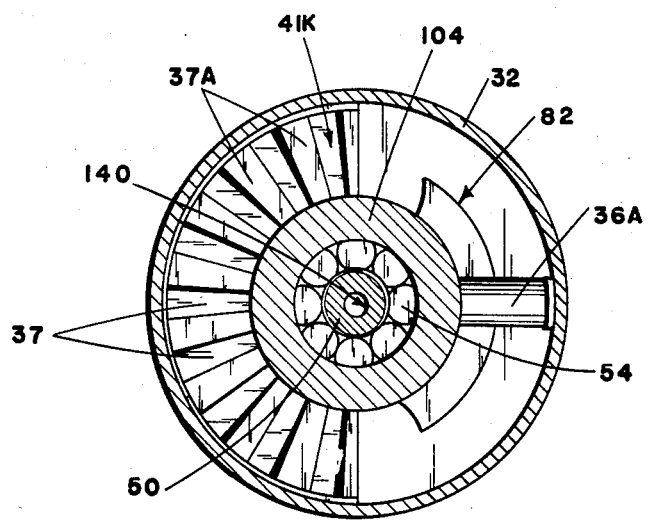
FIG. 11 is a reduced scale sectional view taken generally along line 11—11 of FIG. 3.
Figure 12:
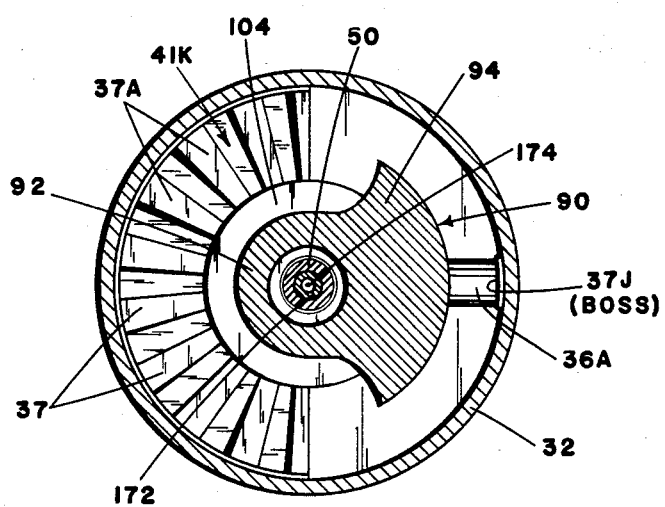
FIG. 12 is a reduced scale sectional view taken generally along line 12—12 of FIG. 3; and, FIG. 13 is a reduced scale sectional view taken generally along line 13—13 of FIG. 3.
Figure 13:
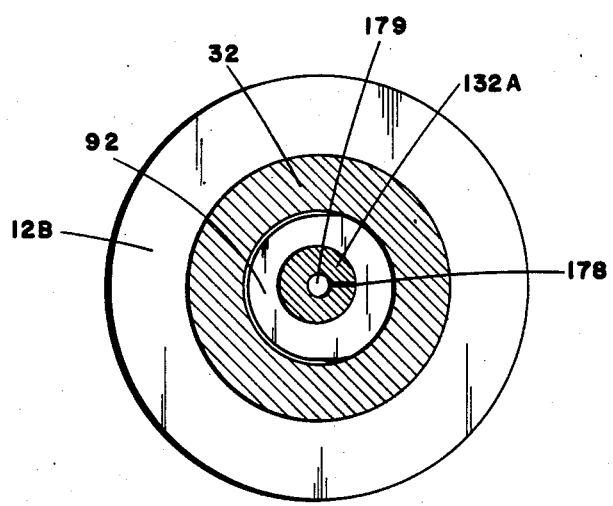

As best viewed in FIGS. 3, 4 and 8-13, an elongated shaft, generally designated by the reference numeral 50, is coaxially vertically mounted for rotation within the casing interior 13. Shaft 50 is radially peripherally surrounded by a plurality of conventional bearings designated by the reference numeral 54 which are confined within the generally cylindrical bearing housing designated by the reference numeral 62, the cylindrical outer peripheral surface of which has been designated by the reference numeral 58A (FIG. 2). Bearing housing 62 is radially supported and structurally braced and centered by the interior webs 37, 36. Thus bearing housing 62 radially confines the conventional bearings 54 about the outer periphery 50E (FIG. 4) of shaft 50. The top casing portion 60 is penetrated by a suitable shaft 72 extending between an intermediate flange 66 and an internal coupling assembly generally designated by the reference numeral 68 (FIGS. 3, 4). Shaft 72 operationally couples external drive shaft 64 to the internal vibrator shaft 50.

Coupling 68 includes a generally disk like member 70 (FIGS. 3, 7-9) journaled for rotation to the reduced diameter shaft 72, and is forceably coupled by mounting pins 76, 77 to a suitable eccentric generally designated by the reference numeral 82. Upper eccentric 82 actually includes a hub portion 84 coaxially penetrated by shaft 72 and an outwardly extending integral mass 86 which, when rotated, provides severe vibration. The eccentric hub 84 is press fitted to the uppermost, integral reduced diameter end portion 50B (FIGS. 3, 4) of the shaft 50.

The lower eccentric, generally designated by the reference numeral 90 (FIGS. 3, 4, and 12), similarly includes a hub 92 integral with an outer mass 94. Eccentric 90 is splined to the lowermost reduced diameter portions 50H of shaft 50, and it is thus rotatably disposed in the lower compartment 13B (FIGS. 2, 3) interiorly of the vibrator casing. It will thus be appreciated that motor rotation of external shaft 54 ultimately causes the rotation of shaft 50 and hence rotation of both eccentrics coupled thereto, forcibly causing significant vibrations.

With reference now to FIGS. 2-4, 9 and 11, a pair of annular bearing caps 102, 104, are respectively disposed upon the opposite upper and lower ends respectively of the bearing casing 62. The reference numeral 110 broadly denotes the interior of the bearing casing, in which a critical oil path to be hereinafter described is shown. The central periphery of the upper annular end cap 102 is sealed with an O-ring 113 disposed within a suitable concentric channel. Similarly, a lower O-ring 115 seals annular ring 104. The brace portion 102A of upper ring 102 is sealed against the upper outer periphery of shaft 50 by a suitable conventional seal 108A (FIGS. 3, 4). Similarly the bottom reinforcement plate 104A is sealed against the lower periphery of shaft 50 by a typical double oil seal 108B.

The lowermost confines of the bearing housing interior 110, which has been generally designated by the reference numeral 111, comprises a first oil reservoir the function of which is to be hereinafter described. A second oil reservoir is formed within the recess generally designated by the reference numeral 130 formed in the bottom of the vibrator casing 12, and occupied by a rotatable impeller 132. Impeller 132 is rotatably secured to the shaft 50, and in response to rotation within the oil bath provided by second oil reservoir 130, it helps to lubricate the apparatus as will hereinafter be described.

With primary reference now directed to FIGS. 3-6, the elongated shaft 50 includes an elongated, tubular internal bore 140 which extends substantially coaxially along its length. Bore 140 includes a plurality of internally defined spiral grooves 142 comprising rifling, similar in theory to that which would be encountered in firearm barrels. For the most part the rifling 142 is spiralled within the internal periphery of the tubular interior of shaft 50; however, the rifling spiral 142 terminates in first upper output ports 146, and a lower output port 148. It will be apparent that the first oil reservoir area 111 previously described (i.e. located beneath the bearings 54 but above the annular retaining plate portion 104A) is in flud flow communication with the internal bore 140 through a passageway 150. Upper port 146 is disposed in fluid flow communication with oiling ports 160 (FIG. 5).

The uppermost portion 153 within the bearing assembly (i.e. beneath annular plate portion 102A and above bearing 54) is in fluid flow communication with bore 140 via a passageway 160. in response to rapid rotation of the shaft 50, the rifling 142 defined within its inner perimeter thus sucks oil from the first reservoir 111 through passageway 150 upwardly throughout the rifled bore 140. This is primarily effectuated by the spiral rifling 142, and when the rifling terminates in portion 146 (FIG. 5) oil is forceably ejected out port 160 and distributed within the region 153 (FIGS. 3, 4) previously described. Hence forced oiling occurs and oil may drop downwardly through the bearings within region 110 (i.e. within the regions of space between the generally cylindrical bearings FIGS. 6, 7). Oil distribution about the periphery of the bearings is encouraged by conventional annular oiling grooves 52.

Inevitably as a consequence fo the vibrations experienced by the aforedescribed rotating parts, oil will be distributed generally throughout the interior confines of the casing. In addition, leakage through and around the previously described gaskets 108A and 108B and the O-ring seals 113 and 115 (i.e. which isolate bearing region 110) will occur, and oil will thus gravitate toward the bottom of the casing, accumulating within a second reservoir 130.

The lower impeller 132 (FIGS. 3, 4, 6 and 13) includes a central orifice 131 press fitted to a tubular coupling nipple 172 which is in turn press fitted into a suitable coaxially aligned orifice 129B (FIG. 4) defined coaxially at the bottom of the bore 140 of shaft 50. It will be apparent that nipple 172 includes an tubular interior 174, and impeller 132 includes a plurality of radially spaced apart internal passageways 178 connecting its tubular interior 179 via the interior 174 of nipple 172 to the bore 140 of shaft 50

A spherical check valve 120 is disposed within the shaft bore to maintain a small quantity of lubricating oil within the bore even after periods of vibrator shut down. Check valve 120 is interiorly disposed at the bottom the shaft bore 140, adjacent the upper tubular end of the nipple 172. When the vibrator is "off" valve 120 blocks nipple passage 174 thereby impeding gravity induced dropping of oil into reservoir 130. In operation oil pressure transmitted to bore 174 displaces valve 120 to permit normal oiling, and thus normal passage of oil into shaft bore 140.

Because of the arrangement of the impeller passageways 178, which substantially perpendicularly penetrate the outer impeller periphery 132E (FIG. 6) and extend interiorly of the impeller, intersecting the central orifice 131 substantially tangentially, oil disposed within the second reservoir 130 will be sucked inwardly through the impeller in response to forcible rotation. Thence oil will be forced upwardly through nipple interior 174 interiorly of bore 140, overcoming predetermined resistance from the check valve 120, where it will thereafter be forced upwardly for oiling in the manner previously described. Importantly, a comparison of FIG. 5 with FIG. 6 will reveal that the construction of oil output ports 160 is similar to ports 178, but oil will be forcibly outwardly dispensed therefrom by centrifugal force.

With reference now directed to FIGS. 3 and 9-12, the web mounting structure previously broadly designated by the reference numerals 36, and 37 will be further explained. Web portion 37 actually comprises a plurality of separate, individual radially spaced apart members 37A (FIG. 9) which are separated by suitable spaces 41K and function as a unit to help balance and brace the bearing enclosure previously described in response to the severe inertial forces generated thereby. Spaces 41K facilitate the dissipation of heat, since the thus-expanded internal surface area of web 37 is thus able to transmit more heat to the oil (and air) passing through the passages 41K. As best viewed in FIGS. 11 and 12, web reinforcement member 36 actually comprises a rigid, generally cylindrical elongated rod which extends between a suitable boss 34J (FIG. 3) and the bearing housing 58A.

From the foregoing, it will be seen that this invention is one well adapted to obtain all the ends and objects herein set forth, together with other advantages which are obvious and which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

What is claimed is:

1. An industrial vibrator adapted for vertical installation, said vibrator comprising:

a rigid, generally cylindrical vibrator casing including an interior opening, a longitudinal axis and a top and a bottom, said casing being substantially sealed on its top and bottom extremes by stationary annular end caps and adapted to be vertically secured upon an intended application;

an elongated, rotatable shaft substantially coaxially disposed vertically within said casing and adapted to be forcibly rotated by an external conventional motor, said shaft having a radial periphery;

a hollow, tubular, central bore coaxially defined within said shaft, said bore being internally rifled;

bearing means disposed within said casing substantially coaxially about the radial periphery of said shaft for bracing said shaft, said bearing means disposed within a bearing housing extending between upper and lower bearing end caps;

eccentric means coupled to said shaft for forcibly vibrating said casing including an eccentric disposed above said bearing housing and an eccentric disposed below said bearing housing;

first lubricating oil reservoir means disposed within said bearing housing beneath said bearings but above said lower bearing end cap, said first resservoir means being in fluid flow communication with said bore of said shaft, whereby oil may be drawn upwardly in response to shaft rotation via said shaft rifling;

upper shaft output port means disposed at the top of said shaft in fluid flow communication with said bore adapted to receive and distribute oil pumped upwardly thereby for subsequent ejection into and recirculation within said bearing housing;

second oil reservoir means disposed within said casing beneath said lower eccentric;

impeller means rotatably disposed within said second reservoir means and driven by said shaft, said impeller means including inlet port means communicating with said shaft interior, whereby rotation of said shaft sucks oil disposed within said second reservoir means through said inlet port means to said rifled bore and circulates oil upwardly within said bearing housing to initially oil the bearings and other internal vibrator parts when said vibrator starts;

lower shaft output port means in fluid flow communication with said shaft bore for initially forcing oil drawn from said second oil reservoir means into said bearing housing; and, one-way check valve means internaly associated within said bore of said shaft for allowing the upward passage of oil from said second reservoir during shaft rotation and for preventing reverse flow of oil to resist the draining of oil from said shaft bore and said first reservoir.

* * * * *